(12) United States Patent
Hedman (10) Patent No.: US 12,000,462 B2
(45) Date of Patent: Jun. 4, 2024

(54) TRANSMISSION ASSEMBLY FOR A VEHICLE

(71) Applicant: VOLVO TRUCK CORPORATION, Gothenburg (SE)

(72) Inventor: Anders Hedman, Marstrand (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 24 days.

(21) Appl. No.: 17/774,492

(22) PCT Filed: Nov. 5, 2019

(86) PCT No.: PCT/EP2019/080274
§ 371 (c)(1),
(2) Date: May 5, 2022

(87) PCT Pub. No.: WO2021/089126
PCT Pub. Date: May 14, 2021

(65) Prior Publication Data
US 2022/0381323 A1 Dec. 1, 2022

(51) Int. Cl.
*F16H 3/091* (2006.01)
*B60K 1/02* (2006.01)
(Continued)

(52) U.S. Cl.
CPC ............... *F16H 3/087* (2013.01); *B60K 1/02* (2013.01); *F16H 3/091* (2013.01); *F16H 37/065* (2013.01);
(Continued)

(58) Field of Classification Search
CPC ..... F16H 3/091–093; F16H 2003/0826; F16H 37/065; B60K 1/00–02
See application file for complete search history.

(56) References Cited

U.S. PATENT DOCUMENTS

| 5,329,828 A | 7/1994 | Hurth |
| 6,619,150 B2 * | 9/2003 | Suzuki .................... F16H 3/093 74/331 |

(Continued)

FOREIGN PATENT DOCUMENTS

| DE | 102017201174 A1 * | 7/2018 |
| EP | 2436950 A2 | 4/2012 |
| WO | WO 2007/031399 A1 | 3/2007 |

OTHER PUBLICATIONS

International Search Report and Written Opinion of the International Searching Authority, PCT/EP2019/080274, mailed Feb. 10, 2020, 11 pages.

(Continued)

*Primary Examiner* — Jacob S. Scott
*Assistant Examiner* — Lillian T Nguyen
(74) *Attorney, Agent, or Firm* — Sage Patent Group (57) ABSTRACT

A transmission assembly for a vehicle includes a first input shaft, a second input shaft and a common output shaft, a first input shaft first gear wheel and a first input shaft second gear wheel arranged axially offset with respect to each other on the first input shaft, a second input shaft first gear wheel and a second input shaft second gear wheel arranged axially offset with respect to each other on the second input shaft, an output shaft first gear wheel and an output shaft second gear wheel arranged axially offset with respect to each other on the common output shaft, wherein each one of the first input shaft first gear wheel and the second input shaft first gear wheel is meshing with the output shaft first gear wheel.

17 Claims, 7 Drawing Sheets

(51) Int. Cl.
*F16H 3/087* (2006.01)
*F16H 37/06* (2006.01)
*F16H 3/08* (2006.01)

(52) U.S. Cl.
CPC ........... *F16H 2003/0826* (2013.01); *F16H 2200/0021* (2013.01); *F16H 2200/0052* (2013.01)

(56) References Cited

U.S. PATENT DOCUMENTS

| | | | |
|---|---|---|---|
| 2010/0311540 A1* | 12/2010 | Hellenbroich | B60L 15/2009 180/65.21 |
| 2012/0010035 A1* | 1/2012 | Hemphill | B60K 6/365 475/5 |
| 2018/0363730 A1 | 12/2018 | Wafzig et al. | |
| 2019/0152311 A1* | 5/2019 | Eo | F16H 37/065 |

OTHER PUBLICATIONS

Office Action for Japanese Patent Application No. 2022-525783, mailed Nov. 24, 2023, 6 pages.

\* cited by examiner

|  | G12-G4 | G13 |
|---|---|---|
| "1&2" | ⇐ | ⇐ |
| "2" | ⇐ |  |
| "2&3" | ⇐ | ⇒ |
| "3" |  | ⇒ |
| "3&4" | ⇒ | ⇒ |
| "4" | ⇒ |  |

TRANSMISSION ASSEMBLY FOR A VEHICLE

CROSS REFERENCE TO RELATED APPLICATIONS

This application is a 35 U.S.C. § 371 national stage application of PCT International Application No. PCT/EP2019/080274 filed on Nov. 5, 2019, the disclosure and content of which is incorporated by reference herein in its entirety.

TECHNICAL FIELD

The invention relates to a transmission assembly for a vehicle, a power transmission arrangement for a vehicle, a vehicle and/or to a method for applying a gear of a transmission assembly.

The invention can be applied in heavy-duty vehicles, such as trucks, buses and construction equipment. Although the invention will be described with respect to a heavy-duty truck, the invention is not restricted to this particular vehicle, but may also be used in other vehicles such as light-weight trucks, articulated haulers, excavators, wheel loaders and backhoe loaders, and also passenger cars.

BACKGROUND

Transmission assemblies for vehicles, also known as gearboxes, are configured for providing controlled application of power, by use of a number of drivingly connected gear wheels, from an input shaft to an output shaft. The transmission assembly hence comprises one or more gear wheels for providing speed and torque conversions from a rotating power source to e.g. one or more driven axles of a vehicle.

The rotating power source may be any kind of power source, such as an internal combustion engine and one or more electrical motors. The transmission assembly may hence be part of a power transmission arrangement for a vehicle which comprises the one or more power sources. It is for example known to provide a vehicle with at least two separate power sources, where the power therefrom is provided via respective input shafts of the transmission assembly. Therefore such a transmission assembly may comprise at least two input shafts and at least one common output shaft.

For example, the above mentioned transmission assembly may comprise four different gears provided by respective meshing gear wheels where two of the gears are provided between one of the input shafts and the common output shaft and the two other gears are provided between the other one of the input shafts and the common output shaft. The four gears of the transmission assembly may be configured in two axially separate gear planes, with gear one and two in the first gear plane and gear three and four in the second gear plane. Gear wheels on the input shafts are freely rotatable thereon and gear wheels on the common output shaft are rotationally fixed thereon. Clutch members, such as dog clutches, are used for engaging/disengaging the different gear wheels on the input shafts.

Even though the above mentioned transmission assembly has shown to provide an efficient power transfer from at least two power sources to one common output shaft, there is still a strive towards developing further improved transmission assemblies.

SUMMARY

In view of the above, an object of the invention is to provide an improved transmission assembly for a vehicle, a power transmission arrangement, a vehicle and/or an improved method for applying a gear of a transmission assembly which at least in some aspect alleviates at least one of the drawbacks of the prior art, and/or to at least provide a useful alternative.

According to a first aspect of the invention, the object is achieved by a transmission assembly for a vehicle. According to a second aspect of the invention, the object is achieved by a power transmission arrangement for a vehicle. According to a third aspect of the invention, the object is achieved by a vehicle. According to a fourth aspect of the invention, the object is achieved by a method.

According to the first aspect thereof, the object is achieved by a transmission assembly for a vehicle, comprising a first input shaft, a second input shaft and a common output shaft. The transmission assembly further comprises a first input shaft first gear wheel and a first input shaft second gear wheel arranged axially offset with respect to each other on the first input shaft, and a second input shaft first gear wheel and a second input shaft second gear wheel arranged axially offset with respect to each other on the second input shaft. Further, the transmission assembly comprises an output shaft first gear wheel and an output shaft second gear wheel arranged axially offset with respect to each other on the common output shaft, wherein each one of the first input shaft first gear wheel and the second input shaft first gear wheel is meshing with the output shaft first gear wheel, and wherein each one of the first input shaft second gear wheel and the second input shaft second gear wheel is meshing with the output shaft second gear wheel, and wherein the output shaft first gear wheel is arranged freely rotatable with respect to the common output shaft and the first input shaft first gear wheel is arranged freely rotatable with respect to the first input shaft.

By the provision of the invention as disclosed herein, an improved transmission assembly can be achieved. In fact, the inventor has realized that the first input shaft first gear wheel may in the known transmission assembly rotate with a relatively high speed when at least one of the gears having a torque path via the output shaft second gear wheel is engaged. By providing the output shaft first gear wheel and the first input shaft first gear wheel freely rotatable with respect to their respective shafts; the first input shaft first gear wheel can be allowed to rotate with a lower speed when torque is transferred from any one or both of the input shafts to the common output shaft via the output shaft second gear wheel. Thereby, wear of the first input shaft first gear wheel and its associated components can be reduced. Further, power losses of the transmission assembly may also be reduced. The associated components may for example be a rolling bearing, such as a ball and/or roller bearing for supporting the first input shaft first gear wheel on the first input shaft.

Optionally, the second input shaft first gear wheel may be arranged rotationally fixed with respect to the second input shaft. By providing the second input shaft first gear wheel rotationally fixed to the second input shaft, a less complex transmission assembly may be provided without compromising with its functionality. More specifically, a gear, such as a "second" gear, may be engaged/disengaged without need of a clutch member on the second input shaft for engaging/disengaging the second input shaft first gear wheel. Further, by providing the second input shaft first gear wheel rotationally fixed to its shaft, there is no need of e.g. a rolling bearing therebetween, hence resulting in fewer components than if it was provided freely rotatable. Further, providing the second input shaft first gear wheel rotationally fixed may facilitate manufacturing of the transmission assembly, as will be further elaborated in the below.

Optionally, the first input shaft first gear wheel, the second input shaft first gear wheel and the output shaft first gear wheel may together form a first gear plane, and/or the first input shaft second gear wheel, the second input shaft second gear wheel and the output shaft second gear wheel may together form a second gear plane.

Optionally, the output shaft second gear wheel may be arranged rotationally fixed with respect to the common output shaft, the first input shaft second gear wheel may be arranged freely rotatable with respect to the first input shaft and the second input shaft second gear wheel may be arranged freely rotatable with respect to the second input shaft. Thereby at least four different separate gears may be provided.

Optionally, the transmission assembly may further comprise an output shaft clutch member which is configured to selectively engage and disengage the output shaft first gear wheel with respect to the output shaft, so that when the output shaft first gear wheel is engaged, it is rotatably locked to the output shaft, and when the output shaft first gear wheel is disengaged, it is freely rotatable with respect to the output shaft.

Optionally, the transmission assembly may further comprise a second input shaft clutch member which is configured to selectively engage and disengage the second input shaft second gear wheel with respect to the second input shaft, so that when the second input shaft second gear wheel is engaged, it is rotatably locked to the second input shaft, and when the second input shaft second gear wheel is disengaged, it is freely rotatable with respect to the second input shaft.

Optionally, the output shaft clutch member and the second input shaft clutch member may be configured to move synchronously when engaging and disengaging any one of the output shaft first gear wheel and the second input shaft second gear wheel. Thereby the movement may be controlled in a facilitated manner, with e.g. fewer additional components for providing the movement of the clutch members. Hence, and still optionally, the transmission assembly may further comprise an actuator which is configured to provide the synchronous movement of the output shaft clutch member and the second input shaft clutch member. Thereby, only one actuator may be used for providing the movement. This may also reduce the cost for the transmission assembly.

Optionally, the output shaft clutch member and the second input shaft clutch member may be further configured to assume a common disengaged state where the output shaft first gear wheel and the second input shaft second gear wheel are disengaged. Thereby torque may in such a state only be transferred from the first input shaft to the common output shaft. For example, in such gear state, less power may be consumed, providing improved energy efficiency. Such state may be advantageously used when e.g. a vehicle requires less energy for maintaining or for increasing its velocity, e.g. during highway cruising and/or during downhill movement.

Optionally, the transmission assembly may further comprise a first input shaft clutch member which is configured to selectively engage and disengage the first input shaft first gear wheel with respect to the first input shaft, so that when the first input shaft first gear wheel is engaged, it is rotatably locked to the first input shaft, and when the first input shaft first gear wheel is disengaged, it is freely rotatable with respect to the first input shaft, and/or which is configured to selectively engage and disengage the first input shaft second gear wheel with respect to the first input shaft, so that when the first input shaft second gear wheel is engaged, it is rotatably locked to the first input shaft, and when the first input shaft second gear wheel is disengaged, it is freely rotatable with respect to the first input shaft.

Optionally, the first input shaft clutch member may be further configured to assume a completely disengaged state where both the first input shaft first gear wheel and the first input shaft second gear wheel are disengaged. Similar to the above, in such a state torque may only be transferred from the second input shaft to the common output shaft, thereby reducing power consumption.

Optionally, a gear ratio between the first input shaft first gear wheel and the output shaft first gear wheel may be larger than a gear ratio between the second input shaft first gear wheel and the output shaft first gear wheel.

The term "gear ratio" as used herein may be defined by the following: If a first gear wheel is meshing with a second gear wheel, a gear ratio between the first gear wheel and the second gear wheel is the ratio of the rotational speed of the first gear wheel and the rotational speed of the second gear wheel during use.

Optionally, a gear ratio between the first input shaft second gear wheel and the output shaft second gear wheel may be larger than a gear ratio between the second input shaft second gear wheel and the output shaft second gear wheel.

Still optionally, the gear ratio between the first input shaft second gear wheel and the output shaft second gear wheel may be smaller than the gear ratio between the second input shaft first gear wheel and the output shaft first gear wheel.

In view of the above, at least two gears, such as four gears, with different gear ratios may be advantageously provided, wherein wear and/or power losses at the first input shaft first gear wheel can be reduced.

Optionally, the second input shaft first gear wheel may be provided as an integrated portion of the second input shaft. Thereby fewer separate components may be required, which in turn may provide cost benefits. Further, fewer separate components may be beneficial for improving the robustness and reliability of the transmission assembly. More specifically, by integrating the second input shaft first gear wheel with the second input shaft, manufacturing of said components may be made in one single manufacturing process, which may imply a reduced manufacturing cost. Also, the risk of problems, such as wear, corrosion, unwanted clearance etc. in the interface between the second input shaft first gear wheel and second input shaft may be reduced or eliminated.

Optionally, the transmission assembly may further comprise a range gear drivingly connected to the common output shaft, wherein the range gear is configured to be drivingly connected to a driven axle of a vehicle. The range gear may provide further gear states, such as a low gear state and a high gear state. Thereby the range gear may provide increased versatility and performance for the transmission assembly. Still optionally, the range gear may be a planetary gear.

According to the second aspect thereof, the object is achieved by a power transmission arrangement for a vehicle comprising the transmission assembly according to any one of the embodiments of the first aspect of the invention, wherein the power transmission arrangement further comprises a first drive means drivingly connected to the first input shaft for driving the first input shaft, and a second drive means drivingly connected to the second input shaft for driving the second input shaft.

Advantages and effects provided by the second aspect of the invention are largely analogous to the advantages and effects provided by the first aspect of the invention. It shall also be noted that all embodiments of the second aspect of the invention are applicable to and combinable with all embodiments of the first aspect of the invention and vice versa.

Optionally, at least one of the first and second drive means may be an electric motor. The present invention has been found to be particularly useful when electric motors are used as the drive means. In fact, it may be beneficial to provide at least two electric motors instead of only one. This is beneficial in that a more compact design may be provided, and also a more efficient powertrain may be achieved where the electric motors can be run separately and/or together. Still further, one of the electric motors may be used as a generator which is driven by the other electric motor, thereby providing a power harvesting mode for e.g. charging an energy storage source, such as a battery of the vehicle.

According to the third aspect thereof, the object is achieved by a vehicle comprising the transmission assembly according to any one of the embodiments of the first aspect of the invention and/or the power transmission arrangement according to any one of the embodiments of the second aspect of the invention.

Advantages and effects provided by the third aspect of the invention are largely analogous to the advantages and effects provided by the first and second aspects of the invention. It shall also be noted that all embodiments of the third aspect of the invention are applicable to and combinable with all embodiments of the first and second aspects of the invention and vice versa.

According to the fourth aspect thereof, the object is achieved by a method for applying a gear of a transmission assembly according to any one of the embodiments of the first aspect of the invention. The method comprises a step of applying the gear by providing a first torque path from the second input shaft to the output shaft, which first torque path is provided via the second input shaft second gear wheel and the output shaft second gear wheel, whilst the output shaft first gear wheel is in a disengaged state where it is freely rotatable with respect to the output shaft.

Advantages and effects provided by the fourth aspect of the invention are largely analogous to the advantages and effects provided by the first aspect of the invention. It shall also be noted that all embodiments of the fourth aspect of the invention are applicable to and combinable with all embodiments of the first, second and third aspects of the invention and vice versa.

BRIEF DESCRIPTION OF THE DRAWINGS

With reference to the appended drawings, below follows a more detailed description of embodiments of the invention cited as examples.

In the drawings.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

Figure 1:
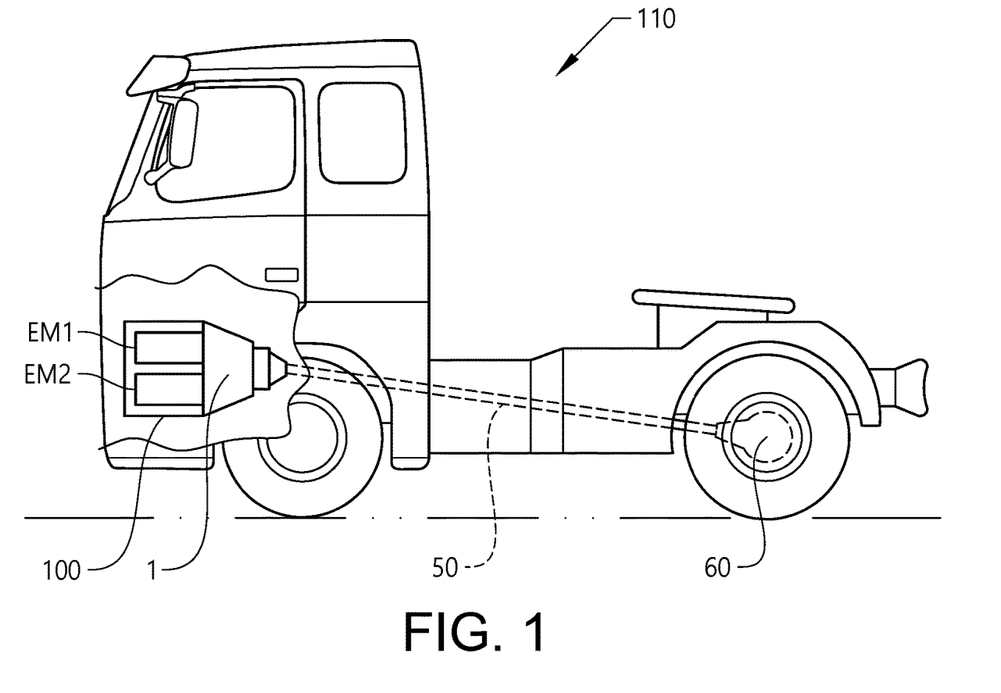
FIG. 1 shows a vehicle in the form of a truck comprising a transmission assembly and a power transmission arrangement according to embodiments of the present invention.

In FIG. 1 a vehicle 110 in the form of a heavy-duty truck is shown. The truck comprises a transmission assembly 1 and a power transmission arrangement 100 according to embodiments of the present invention. The transmission assembly 1 drivingly connects two electric motors EM1, EM2 with a propeller shaft 50, which in turn is drivingly connected to a driven axle 60, for example comprising a differential gear (not shown). It shall be noted that even though one driven axle is shown, the propeller shaft 50 may be connected to more than one driven axle for driving ground engaging means, such as wheels. As also stated in the above, the present invention is not limited to trucks, but may also be used for other types of vehicles, such as buses, construction equipment vehicles etc.

With respect to especially FIGS. 2a-2d, an embodiment of a transmission assembly 1 for a vehicle according to the present invention is schematically shown.

The transmission assembly 1 comprises a first input shaft 10, a second input shaft 20 and a common output shaft 30. It further comprises a first input shaft first gear wheel 11 and a first input shaft second gear wheel 12 arranged axially offset with respect to each other on the first input shaft 10, and a second input shaft first gear wheel 21 and a second input shaft second gear wheel 22 arranged axially offset with respect to each other on the second input shaft 20. Further, the transmission assembly 1 comprises an output shaft first gear wheel 31 and an output shaft second gear wheel 32 arranged axially offset with respect to each other on the common output shaft 30. Each one of the first input shaft 10, the second input shaft 20 and the common output shaft 30 are configured to rotate with respect to a respective rotational axis, A1, A2, A3. Thereby, axially offset as used herein means that the gear wheels are provided offset with respect to each other along the respective rotational axes A1, A2, A3.

Further, as shown, each one of the first input shaft first gear wheel 11 and the second input shaft first gear wheel 21 is meshing with the output shaft first gear wheel 31, and each one of the first input shaft second gear wheel 12 and the second input shaft second gear wheel 22 is meshing with the output shaft second gear wheel 32. Thereby, the first input shaft first gear wheel 11, the second input shaft first gear wheel 21 and the output shaft first gear wheel 31 may together form a first gear plane, and the first input shaft second gear wheel 12, the second input shaft second gear wheel 22 and the output shaft second gear wheel 32 may together form a second gear plane. Said gear planes are likely perpendicular to the rotational axes A1, A2, A3, as indicated in the shown embodiments.

Further, the output shaft first gear wheel 31 is arranged freely rotatable with respect to the common output shaft 30 and the first input shaft first gear wheel 11 is arranged freely rotatable with respect to the first input shaft 10. Thereby, when e.g. a "fourth" gear is engaged, which will be further explained in the below with respect to FIG. 2d and as also shown in FIG. 3, the first input shaft first gear wheel 11 may rotate with a lower speed compared to if the output shaft first gear wheel 31 was rotationally fixed to the common output shaft 30.

Figure 2A:
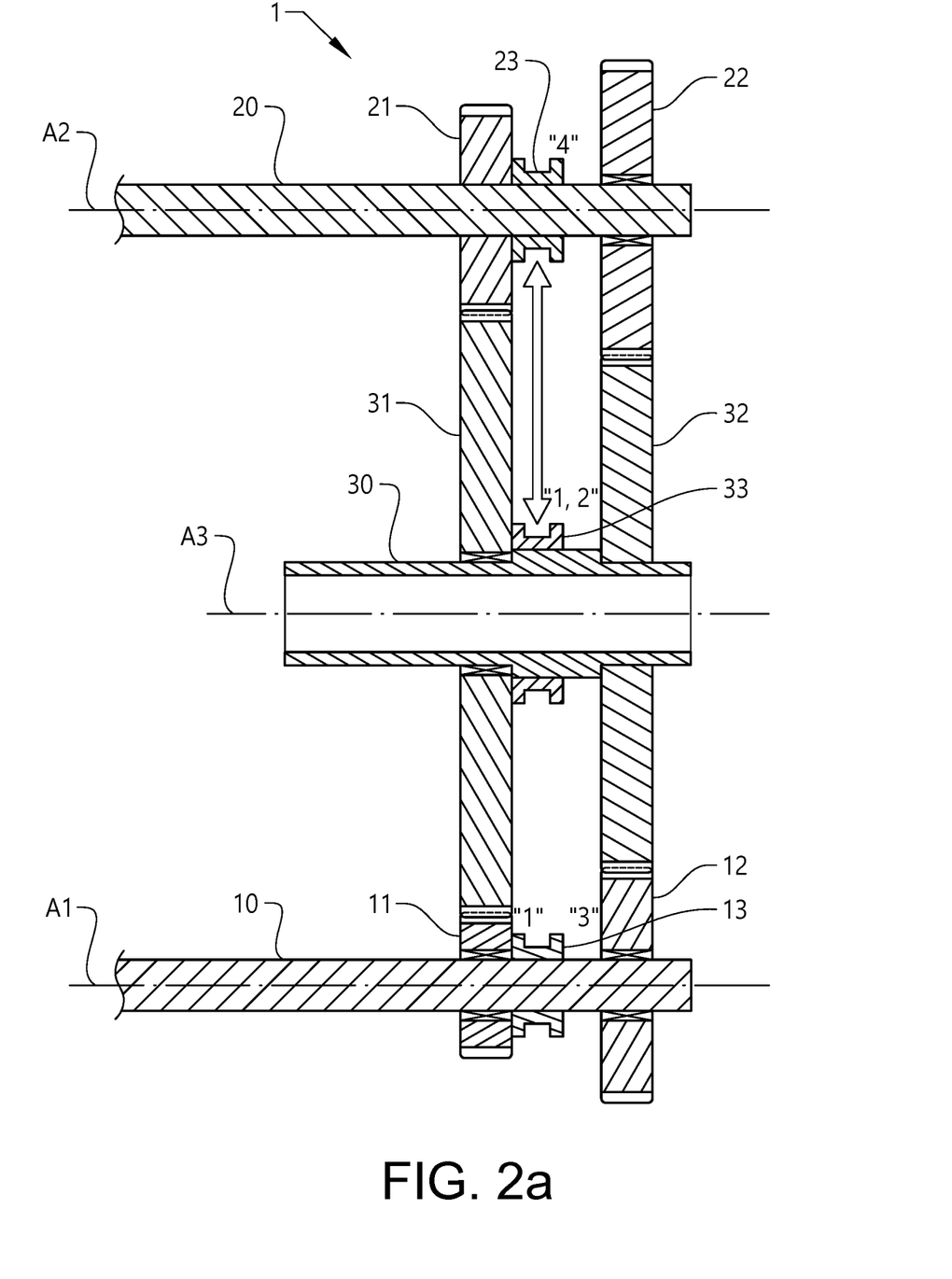
FIGS. 2a-2d show schematic views of a transmission assembly according to an embodiment of the present invention.

The second input shaft first gear wheel 21 is in the shown embodiments arranged rotationally fixed with respect to the second input shaft 20. Thus, in a "first" gear when the first input shaft first gear wheel 11 is engaged with the first input shaft 10, and the output shaft first gear wheel 31 is engaged with the common output shaft 30, also the second input shaft 20 will rotate when the first input shaft 10 is rotating. This gear state is shown in FIG. 2a.

Further, in the embodiment shown in e.g. FIGS. 2a-2d, the output shaft second gear wheel 32 is arranged rotationally fixed with respect to the common output shaft 30, the first input shaft second gear wheel 12 is arranged freely rotatable with respect to the first input shaft 10 and the second input shaft second gear wheel 22 is arranged freely rotatable with respect to the second input shaft 20.

As further shown, the transmission assembly 1 further comprises an output shaft clutch member 33 which is configured to selectively engage and disengage the output shaft first gear wheel 31 with respect to the output shaft 30, so that when the output shaft first gear wheel 31 is engaged, it is rotatably locked to the output shaft 30, and when the output shaft first gear wheel 31 is disengaged, it is freely rotatable with respect to the output shaft 30.

The transmission assembly 1 further comprises a second input shaft clutch member 23 which is configured to selectively engage and disengage the second input shaft second gear wheel 22 with respect to the second input shaft 20, so that when the second input shaft second gear wheel 22 is engaged, it is rotatably locked to the second input shaft 20, and when the second input shaft second gear wheel 22 is disengaged, it is freely rotatable with respect to the second input shaft 20.

Further, as shown in e.g. FIGS. 2a-2d, the output shaft clutch member 33 and the second input shaft clutch member 23 may be configured to move synchronously when engaging and disengaging any one of the output shaft first gear wheel 31 and the second input shaft second gear wheel 22. This is indicated in FIGS. 2a-2d and 4 by an arrow between the clutch members 23, 33. The transmission assembly 1 may further comprise an actuator (not shown) which is configured to provide the synchronous movement of the output shaft clutch member 33 and the second input shaft clutch member 23. Hence, it may be sufficient with one actuator for moving the two shaft clutch members. The shaft clutch members as mentioned herein may be configured in any suitable form known to the skilled person, e.g. it may be any one of a slip/friction clutch and or no-slip clutch, such as a dog clutch. Further, the shaft clutch members are likely moved in axial direction on the respective shafts for engagement/disengagement thereof.

The output shaft clutch member 33 and the second input shaft clutch member 23 are in the shown embodiment further configured to assume a common disengaged state where the output shaft first gear wheel 31 and the second input shaft second gear wheel 22 are disengaged. Thereby the transmission assembly 1 can also be provided in a state where torque cannot be transferred from the second input shaft 20 to the common output shaft 30. Hence, in such state only torque from the first input shaft 10 may be transferred to the common output shaft 30, or no torque at all may be transferred to the common output shaft 30. An example of such a state is for example shown in FIG. 2c, where a torque path is only provided from the first input shaft 10 to the common output shaft 30.

Figure 2B:
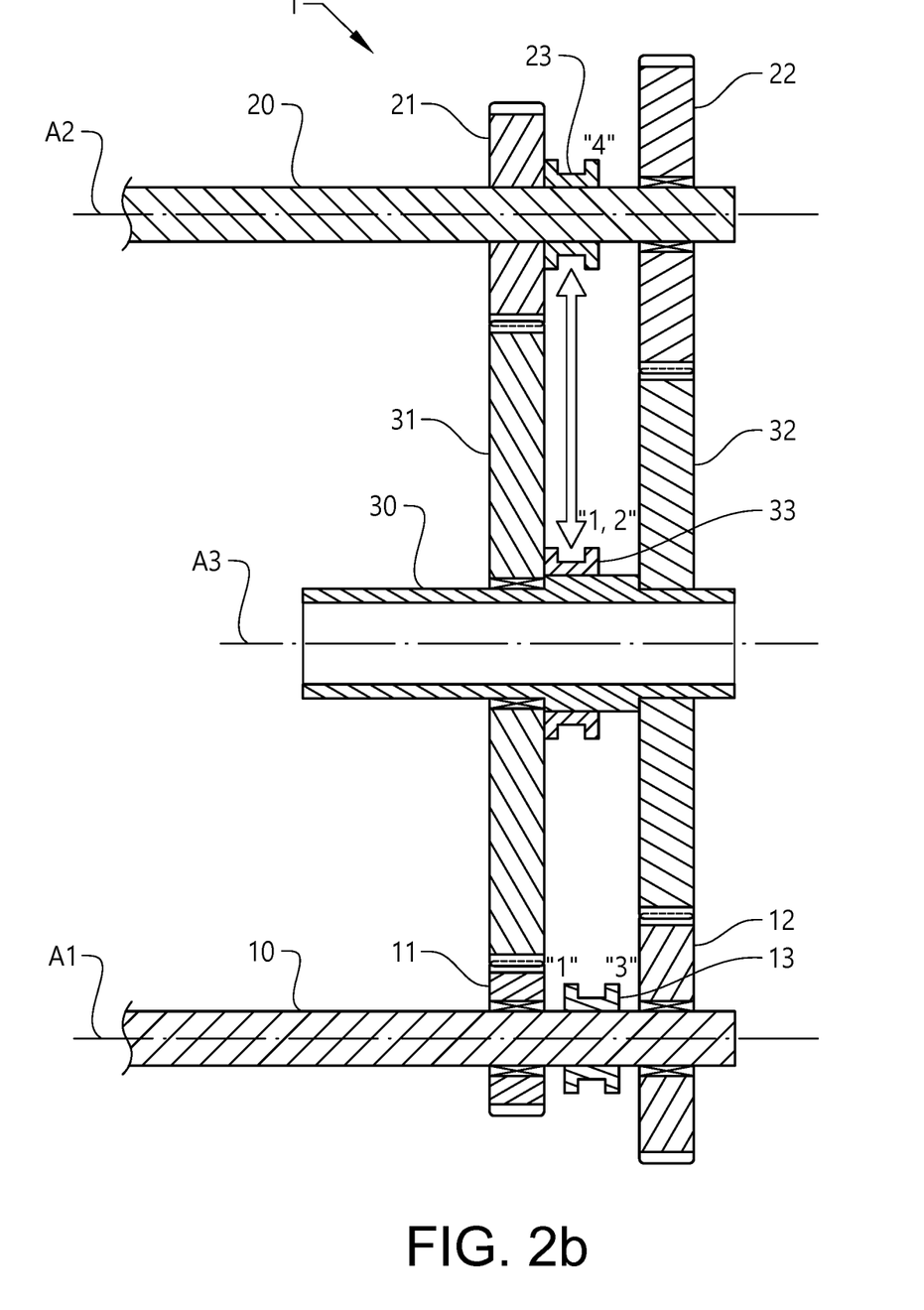
Figure 2C:
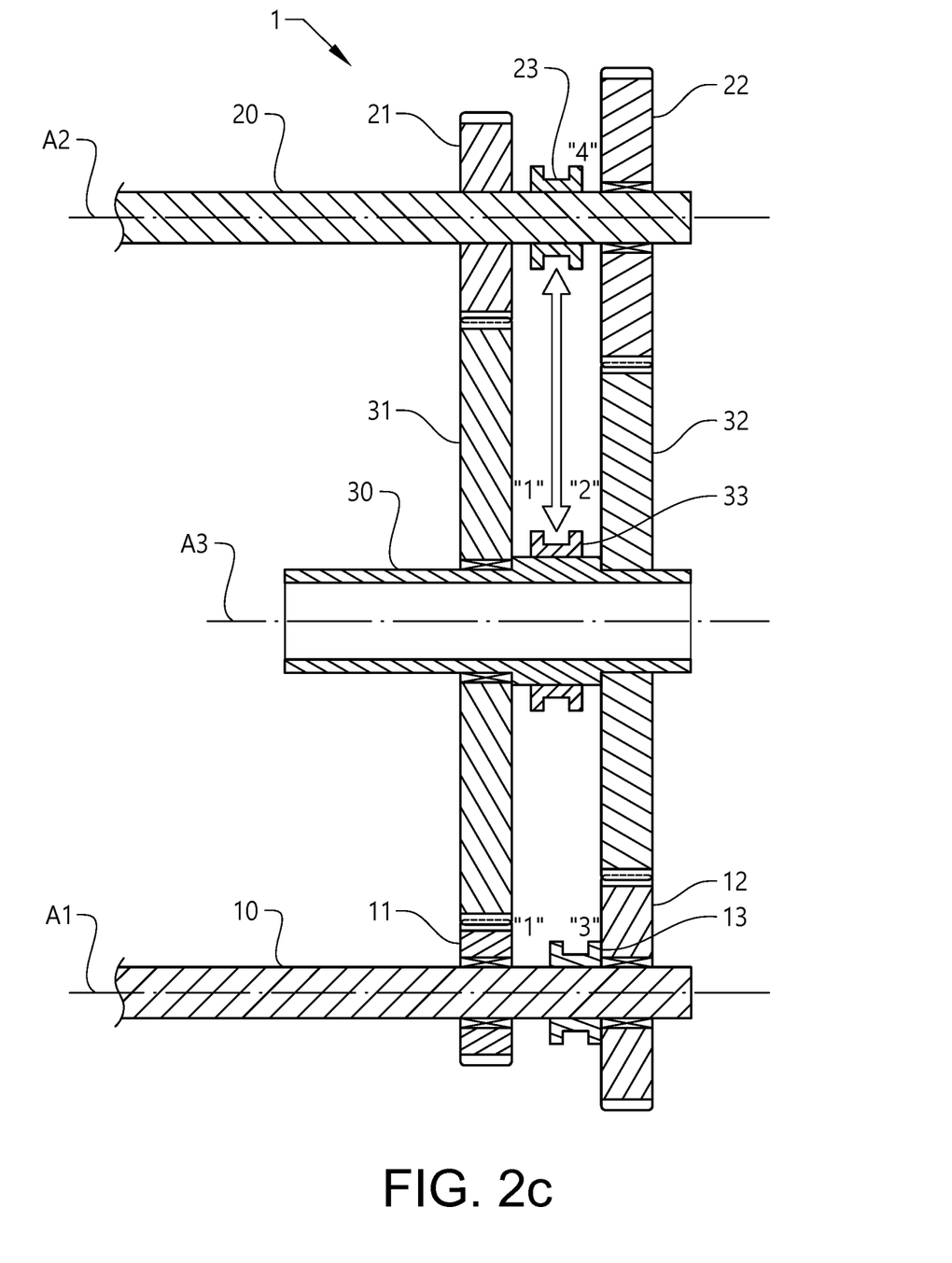

More specifically, as shown in e.g. FIG. 2c, the transmission assembly 1 may further comprise a first input shaft clutch member 13 which is configured to selectively engage and disengage the first input shaft first gear wheel 11 with respect to the first input shaft 10, so that when the first input shaft first gear wheel 11 is engaged, it is rotatably locked to the first input shaft 10, and when the first input shaft first gear wheel 11 is disengaged, it is freely rotatable with respect to the first input shaft 10. The shown first input shaft clutch member 13 is also configured to selectively engage and disengage the first input shaft second gear wheel 12 with respect to the first input shaft 10, so that when the first input shaft second gear wheel 12 is engaged, it is rotatably locked to the first input shaft 10, and when the first input shaft second gear wheel 12 is disengaged, it is freely rotatable with respect to the first input shaft 10. In the example shown in FIG. 2c, the transmission assembly 1 is provided in a "third" gear where the first input shaft clutch member 13 is engaged with the first input shaft second gear wheel 12 and the second input shaft clutch member 23 is in the common disengaged state.

Figure 2D:
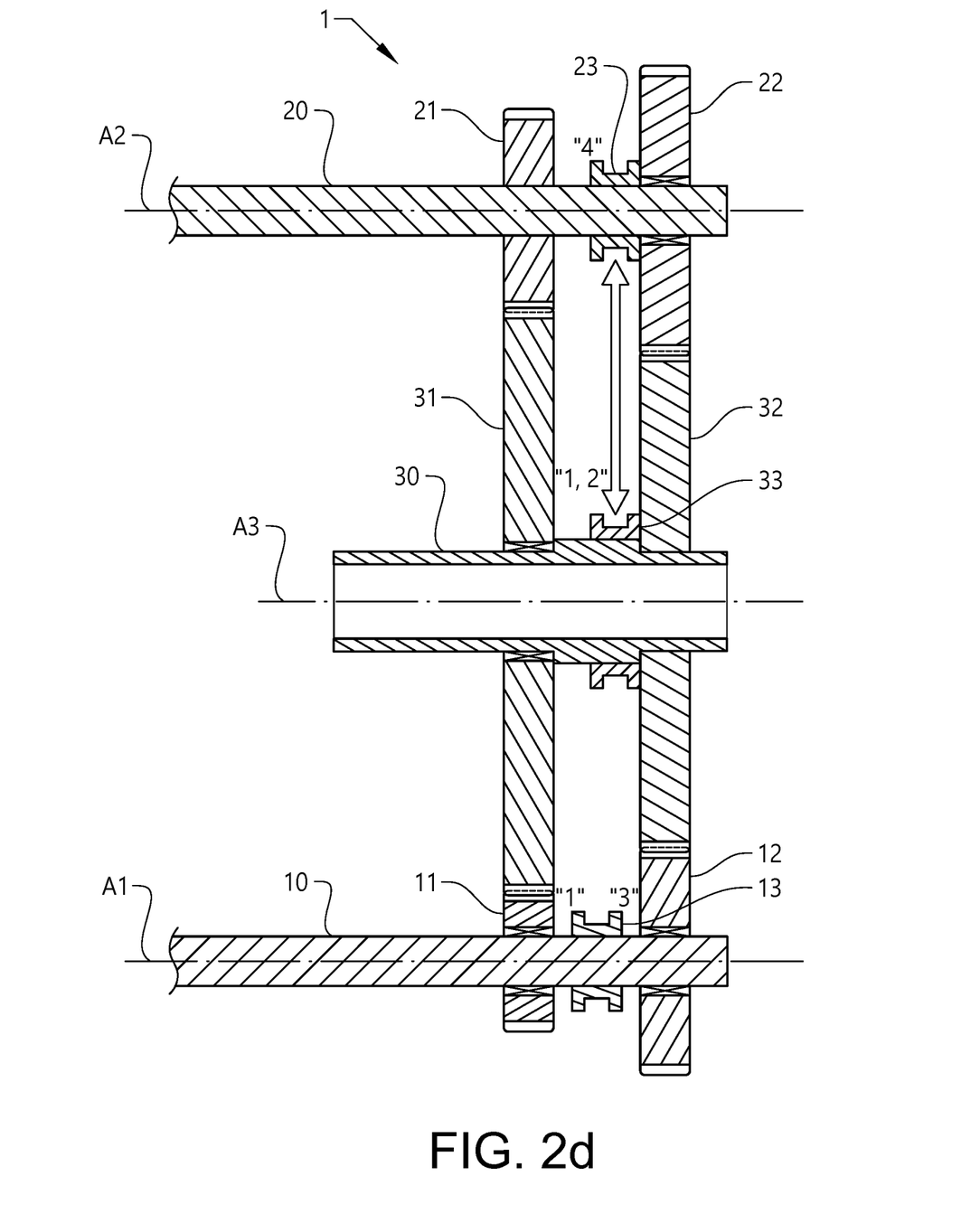
Figure 3:
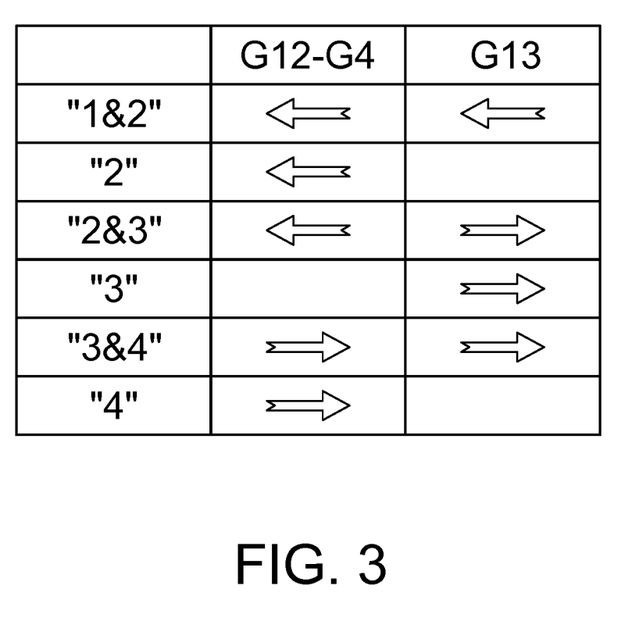
FIG. 3 shows a table of different gears of a transmission assembly according to the present invention.

The first input shaft clutch member 13 may further be configured to assume a completely disengaged state where both the first input shaft first gear wheel 11 and the first input shaft second gear wheel 12 are disengaged, see FIGS. 2d and 2b.

Further as shown in FIGS. 2a-2d, a gear ratio between the first input shaft first gear wheel 11 and the output shaft first gear wheel 31 may be larger than a gear ratio between the second input shaft first gear wheel 21 and the output shaft first gear wheel 31. Still further, a gear ratio between the first input shaft second gear wheel 12 and the output shaft second gear wheel 32 may be larger than a gear ratio between the second input shaft second gear wheel 22 and the output shaft second gear wheel 32. This is indicated in FIGS. 2a-2d in that the gear wheels have different outer diameters. Further, as shown, the gear ratio between the first input shaft second gear wheel 12 and the output shaft second gear wheel 32 may be smaller than the gear ratio between the second input shaft first gear wheel 21 and the output shaft first gear wheel 31.

FIG. 3 shows a table of different possible gear states for the transmission assembly 1 as shown in FIGS. 2a-2d. The column labelled "G12-G4" refers to the positions of the output shaft clutch member 33 and the second input shaft clutch member 23, either moved to the left for engaging the output shaft first gear wheel 31 (left-pointing arrow in the table), to the right for engaging the second input shaft second gear wheel 22 (right-pointing arrow in the table), or provided in the common disengaged state (no arrow in the table). The column labelled G13 refers to the position of the first input shaft clutch member 13, either moved to the left for engaging the first input shaft first gear wheel 11 (left-pointing arrow in the table), to the right for engaging the first input shaft second gear wheel 12 (right-pointing arrow in the table), or provided in the common disengaged state (no arrow in the table). The table shows six possible gear states, i.e. "1&2", "2", "2&3", "3", "3&4" and "4". Gear state "1&2" corresponds to the state shown in FIG. 2a, gear state "2" corresponds to the state shown in FIG. 2b, gear state "3"

corresponds to the state shown in FIG. 2c and gear state "4" corresponds to the state shown in FIG. 2d. Hence, four of the six gear states are shown in FIGS. 2a-2d.

Figure 4:
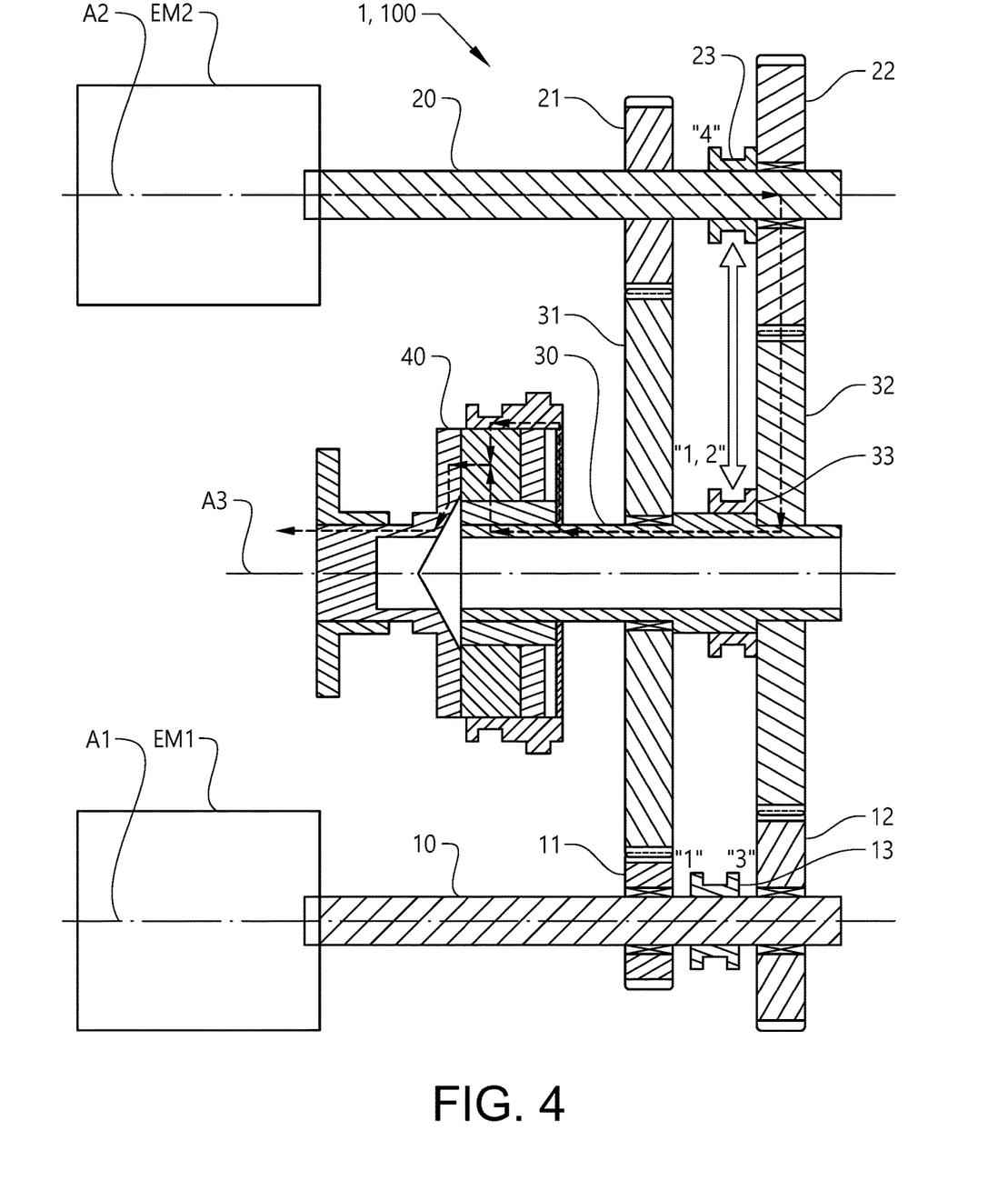
FIG. 4 shows a schematic view of a power transmission arrangement according to an embodiment of the present invention.

The present invention further relates to a power transmission arrangement 100 for a vehicle 110, where an embodiment thereof is shown in FIG. 4. The shown power transmission arrangement 100 comprises a transmission assembly 1 as also shown in FIGS. 2a-2d. It further comprises a first drive means EM1 drivingly connected to the first input shaft 10 for driving the first input shaft, and a second drive means EM2 drivingly connected to the second input shaft 20 for driving the second input shaft. The drive means are here in the form of electric motors, which may be turned either clockwise or counter-clockwise. The electric motors EM1 and EM2 may also be used as generators if required. In the shown embodiment the transmission assembly 1 is provided in gear "4", as also shown in FIG. 2d. Thereby a torque path, indicated by arrows, from the electric motor EM2 via the second input shaft 20, the second input shaft second gear wheel 22, the output shaft second gear wheel 32 to the output shaft 30 is provided. Further, the torque path also passes a range gear 40 until it may be further provided to e.g. the propeller shaft 50 as shown in FIG. 1.

Hence, the shown power transmission arrangement 100 further comprises a range gear 40 drivingly connected to the common output shaft 30, wherein the range gear 40 is configured to be drivingly connected to a propeller shaft 50 of a vehicle 110, as shown in FIG. 1. The range gear as shown is a planetary gear.

The present invention further relates to a method for applying a gear of a transmission assembly 1 according to any one of the embodiment of the first aspect of the invention. The method comprises a step of applying the gear by providing a first torque path from the second input shaft 20 to the output shaft 30, which first torque path is provided via the second input shaft second gear wheel 22 and the output shaft second gear wheel 32, whilst the output shaft first gear wheel 31 is in a disengaged state where it is freely rotatable with respect to the output shaft 30. This state is shown in FIGS. 2d and 4.

The method may comprise further optional steps whereby the transmission assembly 1 is provided in any one of the gear states as outlined in the table of FIG. 3, by moving the shaft clutch members to their respective positions. The method may comprise further optional steps by moving at least one of the electric motors in either clockwise or counter-clockwise direction, allowing a vehicle to either run forward or in reverse. The method may comprise further optional steps of providing at least one of the electric motors in a generator mode.

The steps of the method as disclosed herein of the transmission assembly may be performed automatically by an electronic control unit, such as by a gearbox control unit (GCU) known to the person skilled in the art, or by any other electronic control unit, or by more than one electronic control unit, of the vehicle. Thus, according to an embodiment of the present invention, the transmission assembly 1 and/or the power transmission arrangement 100 may further comprise at least one electronic control unit, such as a GCU. Thereby the transmission assembly may be an automated manual transmission or an automatic mechanically engaged transmission (AMT) for a vehicle, such as a truck.

It is to be understood that the present invention is not limited to the embodiments described above and illustrated in the drawings; rather, the skilled person will recognize that many changes and modifications may be made within the scope of the appended claims.

The invention claimed is:

1. A power transmission arrangement for a vehicle, comprising,
   a transmission assembly comprising a first input shaft, a second input shaft and a common output shaft,
   a first drive means drivingly connected to the first input shaft for driving the first input shaft, and
   a second drive means drivingly connected to the second input shaft for driving the second input shaft, wherein the transmission assembly further comprises,
   a first input shaft first gear wheel and a first input shaft second gear wheel arranged axially offset with respect to each other on the first input shaft,
   a second input shaft first gear wheel and a second input shaft second gear wheel arranged axially offset with respect to each other on the second input shaft,
   an output shaft first gear wheel and an output shaft second gear wheel arranged axially offset with respect to each other on the common output shaft,
   wherein each one of the first input shaft first gear wheel and the second input shaft first gear wheel is meshing with the output shaft first gear wheel, and wherein each one of the first input shaft second gear wheel and the second input shaft second gear wheel is meshing with the output shaft second gear wheel,
   wherein the output shaft first gear wheel arranged freely rotatable with respect to the common output shaft and the first input shaft first gear wheel is arranged freely rotatable with respect to the first input shaft, the power transmission arrangement further comprising:
   an output shaft clutch member which is configured to selectively engage and disengage the output shaft first gear wheel with respect to the output shaft, so that when the output shaft first gear wheel is engaged, it is rotatably locked to the output shaft, and when the output shaft first gear wheel is disengaged, it is freely rotatable with respect to the output shaft; and
   a second input shaft clutch member which is configured to selectively engage and disengage the second input shaft second gear wheel with respect to the second input shaft, so that when the second input shaft second gear wheel is engaged, it is rotatably locked to the second input shaft, and when the second input shaft second gear wheel is disengaged, it is freely rotatable with respect to the second input shaft,
   wherein the output shaft clutch member and the second input shaft clutch member are configured to move synchronously when engaging and disengaging any one of the output shaft first gear wheel and the second input shaft second gear wheel.

2. The power transmission arrangement according to claim 1, wherein the second input shaft first gear wheel is arranged rotationally fixed with respect to the second input shaft.

3. The power transmission arrangement according to claim 1, wherein the first input shaft first gear wheel, the second input shaft first gear wheel and the output shaft first gear wheel together form a first gear plane, and/or wherein the first input shaft second gear wheel, the second input shaft second gear wheel and the output shaft second gear wheel together form a second gear plane.

4. The power transmission arrangement according to claim 1, wherein the output shaft second gear wheel is arranged rotationally fixed with respect to the common output shaft, the first input shaft second gear wheel is arranged freely rotatable with respect to the first input shaft and the second input shaft second gear wheel is arranged freely rotatable with respect to the second input shaft.

5. The power transmission arrangement according to claim 1, further comprising an actuator which is configured to provide the synchronous movement of the output shaft clutch member and the second input shaft clutch member.

6. The power transmission arrangement according to claim 1, wherein the output shaft clutch member and the second input shaft clutch member are further configured to assume a common disengaged state where the output shaft first gear wheel and the second input shaft second gear wheel are disengaged.

7. The power transmission arrangement according to claim 1, further comprising a first input shaft clutch member which is configured to selectively engage and disengage the first input shaft first gear wheel with respect to the first input shaft, so that when the first input shaft first gear wheel is engaged, it is rotatably locked to the first input shaft, and when the first input shaft first gear wheel is disengaged, it is freely rotatable with respect to the first input shaft, and/or which is configured to selectively engage and disengage the first input shaft second gear wheel with respect to the first input shaft, so that when the first input shaft second gear wheel is engaged, it is rotatably locked to the first input shaft, and when the first input shaft second gear wheel is disengaged, it is freely rotatable with respect to the first input shaft.

8. The power transmission arrangement according to claim 7, wherein the first input shaft clutch member is further configured to assume a completely disengaged state where both the first input shaft first gear wheel and the first input shaft second gear wheel are disengaged.

9. The power transmission arrangement according to claim 1, wherein a gear ratio between the first input shaft first gear wheel and the output shaft first gear wheel is larger than a gear ratio between the second input shaft first gear wheel and the output shaft first gear wheel.

10. The power transmission arrangement according to claim 9, wherein the gear ratio between the first input shaft second gear wheel and the output shaft second gear wheel is smaller than the gear ratio between the second input shaft first gear wheel and the output shaft first gear wheel.

11. The power transmission arrangement according to claim 1, wherein a gear ratio between the first input shaft second gear wheel and the output shaft second gear wheel is larger than a gear ratio between the second input shaft second gear wheel and the output shaft second gear wheel.

12. The power transmission arrangement according to claim 1, wherein the second input shaft first gear wheel is provided as an integrated portion of the second input shaft.

13. The power transmission arrangement according to claim 1, further comprising a range gear drivingly connected to the common output shaft, wherein the range gear is configured to be drivingly connected to a driven axle of a vehicle.

14. The power transmission arrangement according to claim 13, wherein the range gear is a planetary gear.

15. The power transmission arrangement according to claim 1, wherein at least one of the first and second drive means is an electric motor.

16. A vehicle comprising the power transmission arrangement according to claim 15.

17. A method for applying a gear of a transmission assembly, wherein the transmission assembly comprises:
   a first input shaft, a second input shaft and a common output shaft,
   a first input shaft first gear wheel and a first input shaft second gear wheel arranged axially offset with respect to each other on the first input shaft,
   a second input shaft first gear wheel and a second input shaft second gear wheel arranged axially offset with respect to each other on the second input shaft,
   an output shaft first gear wheel and an output shaft second gear wheel arranged axially offset with respect to each other on the common output shaft,
   wherein each one of the first input shaft first gear wheel and the second input shaft first gear wheel is meshing with the output shaft first gear wheel, and wherein each one of the first input shaft second gear wheel and the second input shaft second gear wheel is meshing with the output shaft second gear wheel, and wherein the output shaft first gear wheel is arranged freely rotatable with respect to the common output shaft and the first input shaft first gear wheel is arranged freely rotatable with respect to the first input shaft, the transmission assembly further comprising:
   an output shaft clutch member which is configured to selectively engage and disengage the output shaft first gear wheel with respect to the output shaft, so that when the output shaft first gear wheel is engaged, it is rotatably locked to the output shaft, and when the output shaft first gear wheel is disengaged, it is freely rotatable with respect to the output shaft; and
   a second input shaft clutch member which is configured to selectively engage and disengage the second input shaft second gear wheel with respect to the second input shaft, so that when the second input shaft second gear wheel is engaged, it is rotatably locked to the second input shaft, and when the second input shaft second gear wheel is disengaged, it is freely rotatable with respect to the second input shaft,
   wherein the output shaft clutch member and the second input shaft clutch member are configured to move synchronously when engaging and disengaging any one of the output shaft first gear wheel and the second input shaft second gear wheel,
   the method comprising a step of applying the gear by providing a first torque path from the second input shaft to the output shaft, which first torque path is provided via the second input shaft second gear wheel and the output shaft second gear wheel, whilst the output shaft first gear wheel is in a disengaged state where it is freely rotatable with respect to the output shaft.

* * * * *